(12) United States Patent
McGuire

(10) Patent No.: US 6,378,851 B1
(45) Date of Patent: Apr. 30, 2002

(54) FLUID AND ELASTOMER APPARATUS WITH DISCRETE VOLUME COMPENSATOR AND SECONDARY COMPLIANCE

(75) Inventor: Dennis P. McGuire, Erie, PA (US)

(73) Assignee: Lord Corporation, Cary, NC (US)

( * ) Notice: Subject to any disclaimer, the term of this patent is extended or adjusted under 35 U.S.C. 154(b) by 65 days.

(21) Appl. No.: 09/696,540

(22) Filed: Oct. 25, 2000

(51) Int. Cl.$^7$ ................................................ F16F 9/10
(52) U.S. Cl. ...................... 267/140.13; 267/33; 267/34; 267/35
(58) Field of Search ....................... 267/33, 34, 35, 267/140.11, 140.13

(56) References Cited

U.S. PATENT DOCUMENTS

| | | | |
|---|---|---|---|
| 2,067,482 A | * | 1/1937 | Foley .......................... 267/35 |
| 4,342,446 A | * | 8/1982 | Eaton et al. ................... 267/35 |
| 4,811,919 A | | 3/1989 | Jones .......................... 244/54 |
| 4,893,797 A | | 1/1990 | Le Fol et al. ............. 267/140.1 |
| 5,121,904 A | | 6/1992 | Freudenberg ............. 267/140.1 |
| 5,127,607 A | | 7/1992 | McGuire ...................... 244/54 |
| 5,127,636 A | | 7/1992 | Spaltofski ................ 267/140.1 |
| 5,174,552 A | | 12/1992 | Hodgson et al. ........ 267/140.11 |
| 5,197,692 A | | 3/1993 | Jones et al. ................... 244/54 |
| 5,312,093 A | | 5/1994 | Smith et al. ................. 267/140 |
| 5,340,093 A | | 8/1994 | Rudolph ...................... 267/219 |
| 5,374,039 A | | 12/1994 | Schmidt et al. ........ 267/140.13 |
| 5,413,320 A | | 5/1995 | Herbst .................... 267/140.13 |
| 5,501,434 A | | 3/1996 | McGuire ............... 267/140.11 |
| 5,540,549 A | | 7/1996 | McGuire .................... 416/140 |
| 5,762,295 A | | 6/1998 | McGuire et al. ............... 244/54 |
| 5,848,782 A | | 12/1998 | Hein et al. ............. 267/140.11 |
| 5,855,364 A | | 1/1999 | Reh et al. ............. 267/140.13 |
| 5,911,412 A | | 6/1999 | Durand et al. ......... 267/140.13 |
| 5,947,457 A | | 9/1999 | Swanson et al. ....... 267/140.14 |
| 5,957,440 A | | 9/1999 | Jones et al. ............ 267/140.14 |
| 6,032,936 A | | 3/2000 | Redinger ............... 267/140.11 |
| 6,092,795 A | | 7/2000 | McGuire ............... 267/140.11 |

FOREIGN PATENT DOCUMENTS

FR        2680845    *   3/1993           267/35

* cited by examiner

Primary Examiner—Matthew C. Graham

(57) ABSTRACT

A fluid and elastomer device for isolating dynamic loading between members connected to the device, the fluid and elastomer device comprising: an inner member that defines a compliance chamber; an outer member that defines an outer housing chamber; an elastomeric element flexibly interconnecting said inner member relative to said outer member; a passageway located in the compliance chamber and flow connecting the compliance chamber with a primary working chamber; a secondary compliance member joined to the passageway in the compliance chamber; a volume compensator located in the housing chamber the volume compensator comprising spring means, piston member at one spring end and a diaphragm member that overlies the piston; a member located between the compliance and housing chambers, the member being moveable with the outer housing, the moveable member in combination with the diaphragm defining a compensator chamber; and a volume of working fluid in said chambers and passageway.

14 Claims, 2 Drawing Sheets

FLUID AND ELASTOMER APPARATUS WITH DISCRETE VOLUME COMPENSATOR AND SECONDARY COMPLIANCE

FIELD OF THE INVENTION

The invention relates to devices for controlling dynamic vibration, and more particularly the invention relates to a fluid and elastomer vibration control device having a volume compensator and means for providing secondary compliance stiffness that are separate and discrete.

BACKGROUND OF THE INVENTION

Fluid and elastomer apparatus, often referred to in the art as hydraulic mountings, isolators and dampers include a fluid which provides for a greater range of isolation and/or damping characteristics than may be achieved in mountings, isolators and dampers that incorporate an elastomer alone. The expanded isolation and/or damping that is achieved by a fluid and elastomer apparatus may be a result of an increase in damping or inertial forces.

Fluid and elastomer isolation apparatus may be either single acting where fluid is pumped in response to the dynamic movement of one or more isolator components in a first direction, or double acting where fluid is pumped in response to the dynamic displacement of one or more isolator components in first and second directions.

Prior art single acting isolation devices include a single means that compensates for both changes in fluid volume due to changes in isolator fluid temperature and/or pressure and also provides secondary compliance for changing the stiffness of the isolator for use in different applications. In prior art single acting isolators, the volume compensation means and means for changing the stiffness of the isolator is comprised of a single flexible diaphragm member.

In many instances such prior art single acting isolators provide effective volume compensation and secondary compliance. However, use of the diaphragm to achieve both volume compensation and secondary compliance has associated shortcomings. In operation, isolators undergo repetitive motion at high pressure, and over time the thin, flexible diaphragms wear out. Additionally, prior art isolators with a single element for producing the required volume compensation and changing the stiffness of the isolator cannot be tuned with the requisite precision or across a broad range of stiffness values. Isolator performance is improved by tuning the device to the suitable stiffness for a particular application. The isolators must be sufficiently flexible to rapidly compensate for static axial displacements in response to temperature buildup as well as dynamic movements, and to provide the appropriate fluid pressure. Stiff isolators that provide effective volume compensation are particularly difficult to provide using prior art systems and methods.

The foregoing illustrates limitations known to exist in present devices and methods. Thus, it is apparent that it would be advantageous to provide an alternative fluid and elastomer isolator that provides effective volume compensation and is tunable with precision and across a broad range of stiffness values. Accordingly, a suitable alternative is provided including features more fully disclosed hereinafter.

SUMMARY OF THE INVENTION

In one aspect of the present invention this is accomplished by providing a fluid and elastomer device including an inner member; and an elastomeric element flexibly interconnecting said inner member relative to said outer member. The fluid and elastomer device includes a compliance chamber; a primary working chamber; a compensator chamber; and a passageway interconnecting the primary working chamber and the compliance chambers. A secondary compliance member is located in the compliance chamber; and a volume compensator defines a portion of the compensator chamber. The volume compensator is located in a housing chamber and is separate from the compliance member.

In the fluid and elastomer device of the present invention the volume compensator includes a piston and diaphragm and the compensator is substantially unaffected by dynamic loading of the device, thereby increasing the useful life of the diaphragm. The fluid and elastomer device includes a restriction plate that defines a portion of the primary working chamber. The restriction plate is movable with the outer member.

The foregoing and other aspects will become apparent from the following detailed description of the invention when considered in conjunction with the accompanying drawing figures.

DETAILED DESCRIPTION OF THE PREFERRED EMBODIMENTS

Figure 1:
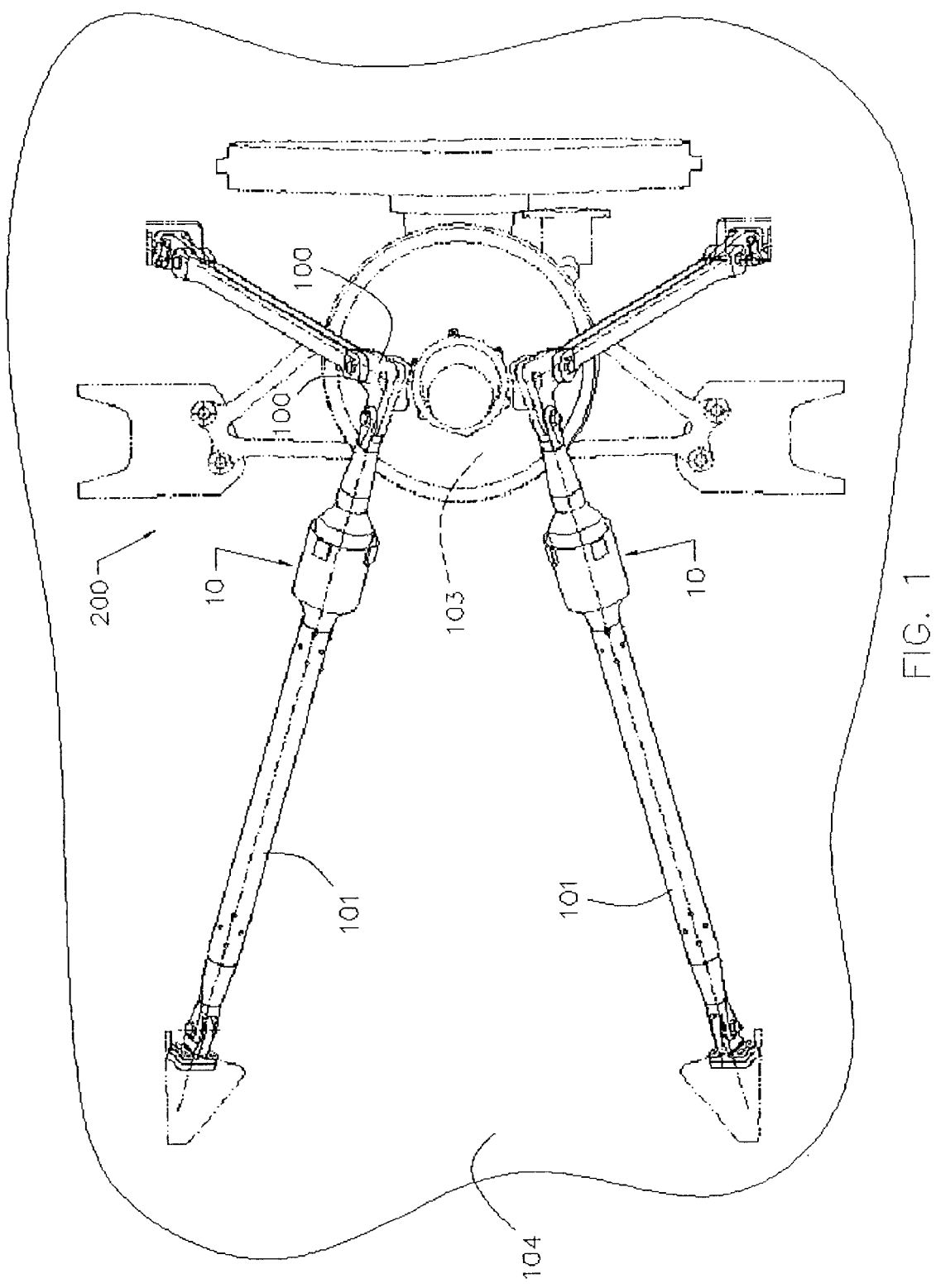
FIG. 1 is an isometric view of the fluid and elastomer isolation device of the present invention mounted for use in an aircraft application.
Figure 2:
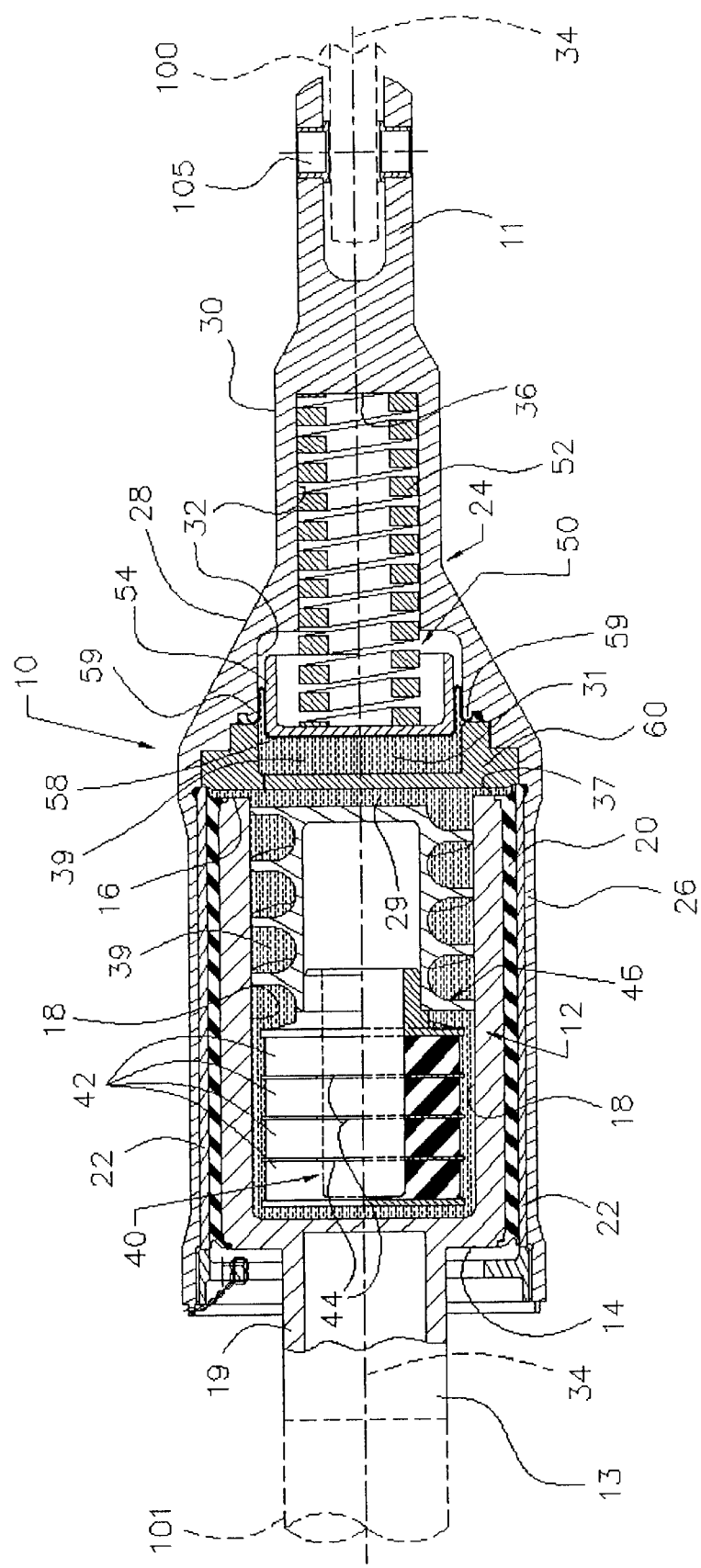
FIG. 2 is a longitudinal sectional view of the fluid and elastomer isolation device of the present invention.

Now turning to the drawing Figures wherein like parts are referred to by the same numbers in the several views, FIG. 1 shows fluid and elastomer device 10 of the present invention installed in an aircraft transmission support structure 200. The aircraft may be a helicopter for example. FIG. 2 is a longitudinal section view of a fluid and elastomer device of the present invention. For clarity, as the description proceeds the invention 10 may be referred to as a "fluid and elastomer device", a "fluid and elastomer apparatus", "fluid and elastomer isolator" or an "isolator". But it should be understood that these terms should not be interpreted as limiting the scope of the present invention and that the present invention may be used as a mount or to provide damping, in addition to its use for vibration isolation as described hereinafter.

The fluid and elastomer isolator 10 is useful for controlling and minimizing dynamic vibration transmitted between a vibrating member 100 and a support structure 101. As shown in FIG. 1, end 11 of the isolator 10 is connected to the vibrating member 100 which in turn is attached to transmission housing 103, and end 13 is attached to the substantially stationary member or airframe fuselage 104 through strut member 101. Although the isolator is shown with end 11 connected to the vibrating member 100, and end 13 attached to the substantially stationary airframe, in an alternate embodiment end 13 could be attached to the vibrating member and end 11 could be joined to the substantially stationary member.

As shown in FIG. 2 the isolator is a single acting tuned fluid and elastomer isolator. The fluid and elastomer isolator 10 comprises an inner housing member 12 that is substantially cylindrical and includes, closed end 14, open end 16 and compliance chamber 18 formed therein between the open and closed ends. The closed end 14 includes a tubular attachment member 19 made integral with the closed end.

The tubular member 19 is adapted to be connected to airframe strut 101 by a conventional means such as a bolt or rivet connection or the like.

A hollow cylindrical elastomer element 20 is conventionally bonded to the outer surface of the inner member 12 and is also preferably bonded to the inner surface of annular sleeve member 22. The elastomer element may be made from any suitable material including natural rubber, blends of natural and synthetic rubber, silicone elastomer, or any other suitable flexible material. For isolator applications the elastomer is preferably lightly damped.

Outer housing member 24 substantially encloses and surrounds the inner housing member 12, elastomeric element 20 and sleeve 22 and attaches to a vibrating member 100 such as a transmission, pylon or component thereof by clevis 105. The elastomeric element 22 flexibly interconnects the inner housing member 12 relative to the outer member 24. The outer housing member is unitary and includes first portion 26 that is substantially cylindrical, second portion 28 that is frustoconical and third portion 30 that is substantially cylindrical. The second portion 28 joins the first and second portions 26 and 30. As shown in FIG. 2 the inner housing, elastomeric element and sleeve are substantially enclosed by the first housing portion 26.

A primary fluid working chamber 29 is defined by the interior wall of the sleeve 22, the face of restriction plate 60 adjacent to element 20, and the face of the passageway 46 adjacent to plate 60. The volume of the primary working chamber varies as the plate 60 moves toward and away from end 16 during operation of isolator 10.

Volume compensator 50 is separate from the secondary compliance member 40 located in compliance chamber 18. The compensator 50 includes a spring 52 that flexibly suspends piston 54 in cavity 32 formed in the outer housing member 24. The spring shown in FIG. 2 is a coil spring although it should be understood that the spring could also be a conventional gas spring. The spring must have a sufficient axial length to displace piston 54 the distance required to compensate for changes in fluid volume. The spring is oriented along the axis of operation 34 with one spring end seated against closed housing chamber end 36 and the opposite end seated against hollow piston 54.

The volume compensator also includes a rolling diaphragm 58 that overlies a portion of and is operative with the piston 54. For purposes of describing the preferred embodiment of the invention the diaphragm may be made be made from a polyester fabric and nitrile elastomer. As shown in FIG. 2, the diaphragm includes a sidewall portion which is doubled over between the sides of the piston 54 and the walls of chamber 32. The outer periphery of the diaphragm is held in place between restriction plate 60 and an annular shoulder 59 along the inner wall of the second chamber portion 28. Volume compensator chamber 31 is defined by restriction plate 60 and diaphragm member 58. In an alternate embodiment the diaphragm may be replaced in the volume compensator by a bellows or by sliding seals.

The piston 54 and diaphragm are displaceable in response to changes in fluid volume experienced during operation of isolator 10. However unlike prior art single acting fluid and elastomer isolation devices, the volume compensator 50 does not undergo any dynamic loading. Therefore piston and diaphragm displacement is effected to compensate for changes in fluid volume produced by significant changes in operating temperature or other factors unrelated to dynamic loading of the fluid and elastomer isolator 10. In this way, the diaphragm 58 will not wear out as frequently as with prior art single acting fluid and elastomer devices.

The restriction plate is threadably connected to the outer member 28 in a conventional manner, and by this connection the plate is fixed during operation of device 10. As shown in FIG. 2, as assembled, a working gap 37 is provided between the restriction plate and end 16. The restriction plate includes at least one restricted opening (not shown) that permits fluid 39 to pass through the plate between the compensation and primary working chambers when the fluid is under the requisite pressure. The lateral end of member 22 directed toward end 11 is butted against plate 60.

Thus dynamic loading transmitted through the outer member causes the restriction plate and housing 24 to move as a single unit relative to the inner housing 12 toward and away from open end 16 and along axis of operation 34. The restriction plate eliminates dynamic movement of the fluid by the volume compensator. Therefore the volume compensator has no significant effects on the dynamics of device 10.

Secondary compliance member 40 is located in the compliance chamber 18 in working fluid 39 and is comprised of a cylindrical multi-layer member with alternating bonded elastomer members and metal shims 42 and 44. The secondary compliance member is threadably connected to passageway 46. The compliance member can be easily changed out or reconfigured with different material shims and/or elastomer members and in this way the stiffness of member 40 can be tuned easily and efficiently. It should be understood that other geometries such as a rolling diaphragm or a bellows could be used as the secondary compliance element 40 however the multi-layer member is illustrated for purposes of describing the preferred embodiment of the invention. The secondary compliance element is used to tune the isolator to improve performance of the isolator. By incorporating a separate volume compensator 50 and secondary compliance element 40 the fluid and elastomer isolator 10 of the present invention provides greater flexibility and precision when defining the stiffness of the secondary compliance member.

The passageway 46 is made integral with the secondary compliance element and is located in the compliance chamber 18. The passageway is preferably an inertia track that has a helical shape which provides for a relatively compact passageway of the required length. An inertia track is any passageway that has a tuned inertia, for example a fluid mass which resonates at a selected frequency within the passageway. The length and area of the inertia track is selected to tune to the resonant frequency of the fluid.

The working fluid 39 is contained in the passageway 46 and in the compliance, compensator and primary working chambers 18, 31 and 29 respectively. Preferable working fluids include silicone oils and perfluorinated fluids. In the case of the fluid and elastomer isolator 10, preferable fluids are generally those that exhibit high density and low viscosity with viscosities on the order of 1–10 centistokes.

During operation of the aircraft, dynamic loading produced by the vibrating member 100 is transferred through the outer housing member 24, resulting in displacement of housing and restriction plate 60 along axis 34, and relative to housing 12, toward and away from housing end 16. As a result of movement of the housing 24 and plate 60 toward end 16, fluid 39 is displaced from the primary working chamber 29 to the passageway 46 and primary vibration compliance is provided. A volume of the fluid in the passageway 46 is displaced into the compliance chamber 18. The fluid is transferred toward the primary working chamber 29 as the plate 60 is translated away from end 16. During operation of isolator 10, the dynamic loading experienced by the volume compensator 50 is negligible. When volume compensation is required, the spring length is increased or decreased and as a result the piston and diaphragm are displaced along axis 34 in the direction required to increase or decrease the fluid pressure in the working chambers in response to changes in fluid volume. As the piston and diaphragm are displaced, fluid 39 is transferred through the one or more restricted openings in plate 60.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What is claimed is:

1. A fluid and elastomer device for isolating dynamic loading between members connected to the device, the device comprising: an inner member that defines a compliance chamber; an outer member that defines a housing chamber; an elastomeric element flexibly interconnecting said inner member relative to said outer member; a moveable member, moveable with the outer member; a passageway located in the compliance chamber, the passageway and moveable member substantially defining a primary working chamber, the passageway flow connecting the compliance and primary working chambers; a compliance member located in the compliance chamber; a volume compensator located in the housing chamber; the volume compensator and moveable member defining a compensator chamber, the volume compensator being separate from the compliance member, said volume compensator being substantially unaffected by the dynamic loading of the fluid and elastomer device; and a volume of working fluid in the chambers and passageway.

2. The fluid and elastomer device as claimed in claim 1, wherein the moveable member is comprised of a restriction plate.

3. The fluid and elastomer device as claimed in claim 1 wherein the compliance member is comprised of a combination of elastomeric and metal members.

4. The fluid and elastomer device as claimed in claim 3 wherein the elastomer and metal members are bonded and arranged in alternating layers.

5. The fluid and elastomer device as claimed in claim 1 wherein the passageway and compliance member are threadably connected.

6. The fluid and elastomer device as claimed in claim 1 wherein the volume compensator is comprised of a spring, a piston at one spring end, and a diaphragm member that overlies the piston and is moveable with the piston.

7. The fluid and elastomer device as claimed in claim 1 wherein the movable member is made integral with the outer housing.

8. The fluid and elastomer device as claimed in claim 7 wherein the movable member is threadably connected with the outer housing.

9. A fluid and elastomer device for isolating dynamic loading between members connected to the device, the fluid and elastomer device comprising: an inner member that defines a compliance chamber; an outer member that defines a housing chamber; an elastomeric element flexibly interconnecting said inner member relative to said outer member; a passageway located in the compliance chamber and flow connecting the compliance chamber with a primary working chamber; a secondary compliance member joined to the passageway in the compliance chamber; a volume compensator located in the housing chamber the volume compensator comprising spring means, a piston member at one spring end and a diaphragm member that overlies the piston; a member located between the compliance and housing chambers, the member being moveable with the outer housing, the moveable member in combination with the diaphragm defining a compensator chamber; and a volume of fluid in said chambers and passageway.

10. The fluid and elastomer device as claimed in claim 9 wherein the volume compensator is substantially unaffected by dynamic loading of the device.

11. The fluid and elastomer device as claimed in claim 9 wherein the moveable member is comprised of a restriction plate.

12. The fluid and elastomer device as claimed in claim 9 wherein the primary working chamber is defined by the moveable member and the passageway.

13. The fluid and elastomer device as claimed in claim 9 wherein the movable member is made integral with the outer housing.

14. The fluid and elastomer device as claimed in claim 13 wherein the movable member is threadably connected with the outer housing.

* * * * *